United States Patent
Inoue et al.

(10) Patent No.: US 8,122,992 B2
(45) Date of Patent: Feb. 28, 2012

(54) IMPACT MEMBER FOR A SADDLE-TYPE VEHICLE, AND VEHICLE INCORPORATING SAME

(75) Inventors: Yoshihiro Inoue, Saitama (JP); Kenichi Misaki, Saitama (JP); Kazuyoshi Kuroki, Saitama (JP); Hiroshi Furuse, Saitama (JP); Sunao Kawano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 12/717,711

(22) Filed: Mar. 4, 2010

(65) Prior Publication Data

US 2010/0243362 A1    Sep. 30, 2010

(30) Foreign Application Priority Data

Mar. 30, 2009 (JP) ................... 2009-083657

(51) Int. Cl.
*B60K 5/00* (2006.01)
(52) U.S. Cl. ...................................... 180/232
(58) Field of Classification Search .......... 180/232, 180/219, 225, 228, 312
See application file for complete search history.

(56) References Cited

U.S. PATENT DOCUMENTS

| 7,730,985 | B2 * | 6/2010 | Oohashi | 180/68.5 |
| 7,971,672 | B2 * | 7/2011 | Kubo et al. | 180/219 |
| 2005/0133283 | A1 * | 6/2005 | Horii | 180/65.1 |
| 2008/0047769 | A1 * | 2/2008 | Haehnel | 180/232 |

FOREIGN PATENT DOCUMENTS

JP    2002-264866    9/2002

* cited by examiner

*Primary Examiner* — Faye M. Fleming
(74) *Attorney, Agent, or Firm* — Carrier Blackman & Associates, P.C.; William D. Blackman; Joseph P. Carrier

(57) ABSTRACT

A saddle-type vehicle is provided with an impact member for deflecting a front wheel sideways in the event of a collision. The saddle-type vehicle includes a body frame having a head pipe for rotatably supporting a steering shaft for the front wheel, main frames extending rearwards from the head pipe, and an engine operatively mounted to the main frames. The impact member is disposed in front of a lower portion of the engine. The impact member includes a support part, which extends forwardly from the engine, and a load-receiving deflector plate mounted to the support part and which is inclined away from a vehicle width direction.

14 Claims, 12 Drawing Sheets

FIG. 10A
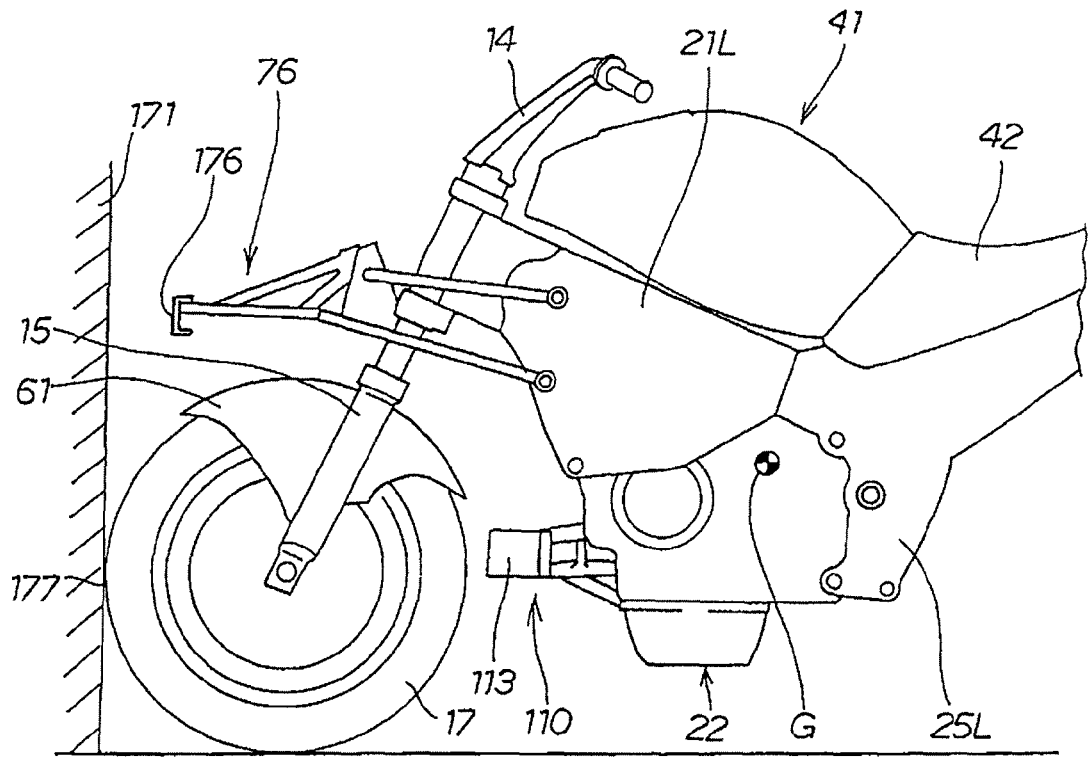
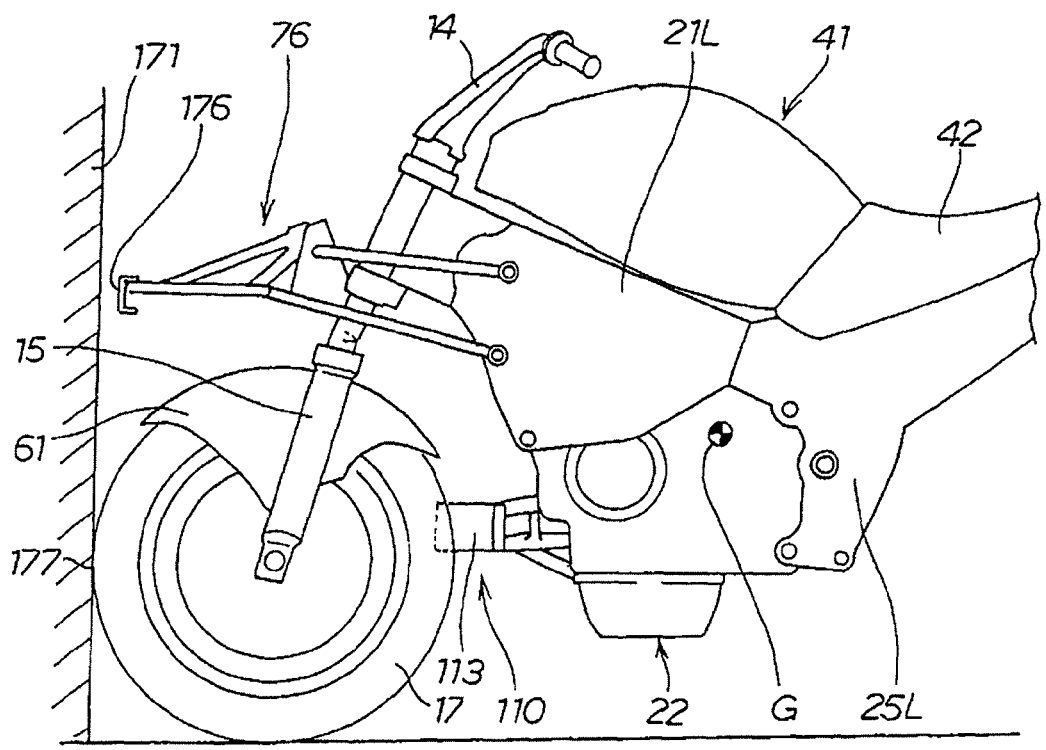
FIG. 10B

IMPACT MEMBER FOR A SADDLE-TYPE VEHICLE, AND VEHICLE INCORPORATING SAME

CROSS-REFERENCE TO RELATED APPLICATIONS

The present invention claims priority under 35 USC §119 based on Japanese patent application No. 2009-083657, filed 30 Mar. 2009. The subject matter of this priority document, including specification, claims and drawings, is incorporated by reference herein.

BACKGROUND OF THE INVENTION

1. Field of the Invention

The present invention relates to an impact member for a saddle-type vehicle having a front wheel provided on a body frame, and to a vehicle incorporating the impact member. More particularly, the present invention relates to a saddle-type vehicle wherein an impact member is disposed in front of a lower portion of the engine, which includes a support part which extends forwards from the engine, and a load-receiving deflector plate mounted to the support part and which is inclined away from a vehicle width direction.

2. Description of the Background Art

A motorcycle design is known in which a front wheel is provided on a body frame and a front part of the body frame, which is located behind the front wheel, is formed in a bow-like shape (similar to the shape of a bow of a boat; see, for example, Japanese Patent Laid-Open No. 2002-264866 (JP '866)).

FIGS. 4(a) and 4(b) from JP '866 are reproduced herein as FIGS. 12A and 12B of the present drawings, in which the original reference numerals from JP '866 have been modified by adding 200 to each of the original numbers.

FIG. 12A is a simplified top plan view of a portion of a prior art motorcycle frame, front fork and wheel, with the motorcycle shown beginning to collide with an obstruction M; and FIG. 12B is a simplified top plan view of the prior art motorcycle frame, front fork and wheel of FIG. 12A, with the motorcycle shown after collision with the obstruction M.

Referring now to FIGS. 12A and 12B, it will be seen that in the prior art design of JP '866, a front wheel 217 is mounted to a body frame 211 through a front fork 216, and a bow 211a is provided by forming a front portion of the body frame 211, which is located behind the front wheel 217, into an asymmetrical bow-like shape similar to the shape of a bow of a boat. In the design of this reference, the bow portion 211a of the body frame 211 is not centered, but is offset from a longitudinal center line of the frame 211 in order to deflect the wheel 217 in a planned way, in an event of an accident. When a large load is applied to the front wheel 217, such as by the front wheel colliding with an obstacle such as a wall M in a manner such that the front wheel 217 is deformed and pushed into the front portion of the body frame 211, the front wheel 217 is deflected or diverted away from the body frame 211 by the bow 211a, thereby allowing for a sufficient deformation of the front fork 216.

In the invention according to JP '866, however, the front portion 211a of the frame 211, which is located behind the front wheel 217, must be formed in a bow-like shape during manufacture thereof. Depending on the structure of the vehicle, it may be difficult, expensive, and/or time consuming to form the body frame 211 into the required bow-like shape.

SUMMARY OF THE INVENTION

It is an object of the present invention to provide a saddle-type vehicle in which a front wheel can be sufficiently displaced in the event of an accident, even where it is difficult to form a front portion of a body frame, which located behind the front wheel, into a bow-like shape.

The invention according to a first aspect of the present invention provides a saddle-type vehicle including a body frame which has a head pipe for rotatably supporting a steering shaft for a front wheel, and a main frame extending rearwards from the head pipe, with an internal combustion engine mounted to the main frame, wherein an impact member for receiving a load exerted from a vehicle front side is disposed in front of a lower portion of the internal combustion engine. The impact member includes a stay portion having a fastening part which is fastened to the internal combustion engine, a support part extending forward from the stay part, and a load-receiving deflector plate mounted to the support part and inclined away from a vehicle width direction when the vehicle is viewed from the upper or lower side.

The invention according to a second aspect of the present invention is characterized in that the support part includes a plurality of support pipes extending in a longitudinal direction of the vehicle; and a cross member disposed in a direction different from the direction of the support pipes is provided across at least two support pipes arrayed in the vehicle width direction of the plurality of support pipes.

The invention according to a third aspect of the present invention is characterized in that an oil cooler is provided at a front portion of the internal combustion engine; and the impact member includes a plate-shaped support piece located in front of the oil cooler and disposed in parallel to a front surface of the oil cooler.

The invention according to a fourth aspect of the present invention is characterized in that the support base member is provided with a base part at an end portion thereof formed to be set along the outer shape of the internal combustion engine.

In the invention according to the first aspect of the present invention, the impact member for receiving a load exerted from the vehicle front side is extended in front of a lower portion of the internal combustion engine, and the impact member includes the load-receiving deflector plate inclined away from the vehicle width direction when the vehicle is viewed from the upper side.

When the front wheel is moved rearward by a large load being exerted on the vehicle from the front side, the front wheel makes contact with the load-receiving deflector plate which is disposed in an inclined state. The load exerted on the load-receiving deflector plate is transmitted to the support part, which is then transmitted from the support part to the stay part and then from the stay part to the internal combustion engine, such that the load is received by the internal combustion engine. Therefore, the load-receiving deflector plate can satisfactorily receive the load exerted from the front wheel, and the front wheel is moved rearward while being steered. Thus, when the front wheel is moved rearward, the front wheel makes contact with the load-receiving deflector plate and is moved along the load-receiving deflector plate.

Since the front wheel, which is displaced rearward, is diverted by the load-receiving deflector plate, it becomes difficult for the front wheel to make direct contact with the internal combustion engine disposed behind the front wheel, therefore allowing the front wheel to be sufficiently displaced rearwards. Since a sufficient displacement amount of the front wheel is allowed, it is possible, when the vehicle receives a large load from the front side, to smoothly absorb the load.

With the configuration of the impact member according to the present invention, a sufficient deformation amount of the front fork is allowed, without forming a front end portion of the body frame into a bow-like shape. Therefore, the front fork can be sufficiently deformed even in the case where it is difficult to provide a bow-shaped part at a front portion of the body frame located behind the front wheel. As such, it is unnecessary to form a front portion of the body frame located behind the front wheel into a bow-like shape or to provide a bow-shaped part at the front portion. Accordingly, the degree of freedom in designing the body frame can be enhanced.

In the invention according to the second aspect of the present invention, the support part includes a plurality of support pipes. When the support part is composed of a plurality of support pipes, inexpensive standard parts can be used, thereby the cost of the support part can be lowered. In addition, the two support pipes are connected to each other by the cross member, which makes it difficult for the support pipes to be toppled when a load is exerted from the front side. When it becomes difficult for the support pipes to be toppled, the bearable load can be increased.

In the invention according to the third aspect of the present invention, the impact member includes the plate-shaped support piece which is located in front of the oil cooler provided at a front portion of the internal combustion engine and which is disposed in parallel to the front surface of the oil cooler.

When the vehicle receives a load from the front side, not only the support pipes mounted to the engine but also the load exerted on the support pipes can be received by the front surface of the oil cooler through the support base member.

Therefore, even in the case where it is difficult to secure a large number of fastening positions at which the stay part for supporting the impact member can be fastened to the internal combustion engine, the load on the impact member can be borne by the large area of the front surface of the oil cooler. In this instance, even if the oil cooler is made of aluminum and the impact member is made of iron, it is possible, by enlarging the area of contact between these component parts, for the front surface of the oil cooler to receive the load exerted from the impact member.

In the invention according to a fourth aspect of the present invention, the support base member is further provided with a base part at an end portion thereof; therefore, the load exerted on the impact member can be received by the base part as a whole. Accordingly, the impact member can be more securely supported by the larger area of the front surface of the engine.

BRIEF DESCRIPTION OF THE DRAWINGS

FIG. 10A illustrates operation of the saddle-type vehicle according to an illustrative embodiment of the invention immediately after a collision has occurred, but before the front wheel has been displaced.

FIG. 10B illustrates operation of the saddle-type vehicle similar to that shown in FIG. 10A, but shown at a time where the front wheel has been displaced rearwardly.

DETAILED DESCRIPTION OF THE PRESENT EMBODIMENT

Figure 1:
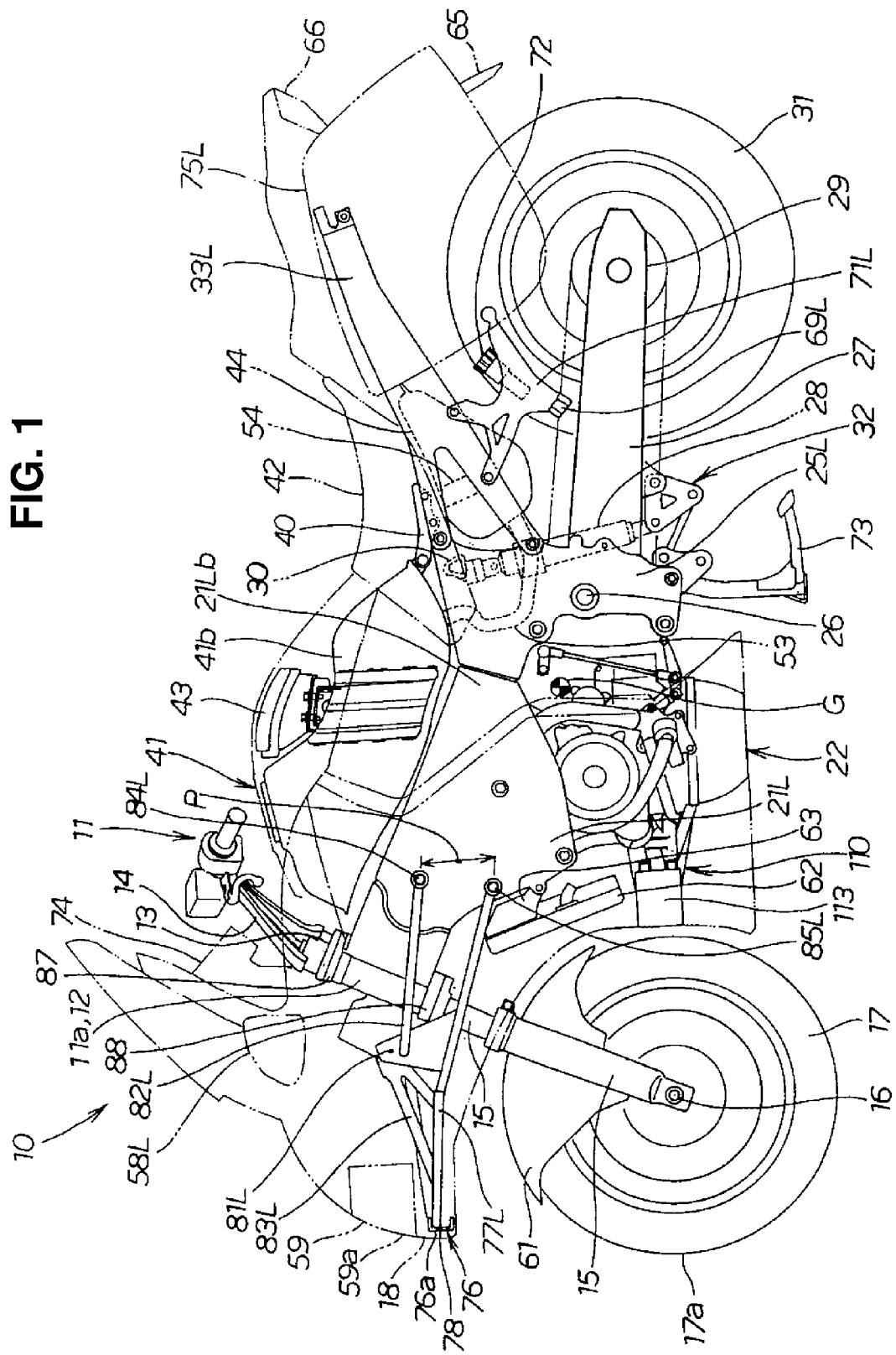
FIG. 1 is a left side plan view of a saddle-type vehicle according to an illustrative embodiment of the present invention.

Now, an illustrative embodiment of the present invention will be described in detail below. In the drawings and the description of the illustrative embodiment, "up (upper)," "down (lower)," "front," "rear," "left," and "right" mean the directions (sides) as viewed from a vantage point of a driver seated on a motorcycle and facing forwardly. Incidentally, the drawings are to be looked at according to the posture of reference numerals.

In FIG. 1, a motorcycle 10 is a saddle-type vehicle including, as its main components: a head pipe 12 provided at a front end portion 11a of a body frame 11; a steering handle bar 14 turnably provided on the head pipe 12 through a steering shaft 13; a front fork 15 connected to the steering shaft 13 and having a cushion function for absorbing vibrations exerted on the vehicle from a road surface or the like; a front wheel 17 turnably mounted to a front axle 16, which is disposed between lower end portions of the front fork 15; main frames 21L, 21R (only 21L on the viewer's side of the drawing is shown) extended toward rear left and right sides from the head pipe 12; an engine 22, which is an internal combustion engine, suspended from the main frames 21L, 21R; pivot parts 25L, 25R (only 25L on the viewer's side of the drawing is shown) provided at rear lower portions of the main frames 21L, 21R; a cross member 30 provided between upper portions of the pivot parts 25L, 25R; seat frames 33L, 33R (only 33L on the viewer's side of the drawing is shown) extended rearward from the pivot parts 25L, 25R; a pivot shaft 26 provided on the pivot parts 25L, 25R; a rear swing arm 27 extended rearward from the pivot shaft 26; a rear cushion unit 28 and a link mechanism 32 which are provided between the rear swing arm 27 and the main frames 21L, 21R and which support the rear swing arm 27 so that the rear swing arm 27 can swing, with the pivot shaft 26 as a center of swinging; a rear axle 29 provided at a rear end portion of the rear swing arm 27; and a rear wheel 31 as a drive wheel which is turnably mounted to the rear axle 29.

Now, the layout of component parts pertaining to an upper portion of the motorcycle will be described below.

The motorcycle 10 includes: a fuel tank 41 provided between the left and right main frames 21L, 21R; the seat frames 33L, 33R extended rearward from rear end portions 21Lb, 21Rb (only 21Lb on the viewer's side of the drawing is shown) of the main frames 21L, 21R; a rider's seat 42 which is supported by the seat frames 33L, 33R and on which a rider is to be seated; and an air bag module 43 provided in front of the rider's seat 42. The fuel tank 41 has its front portion mounted to the main frames 21L, 21R, and has its rear portion mounted to the seat frames 33L, 33R through a tank stay 40. The air bag module 43 is disposed on the upper side of a rear portion 41b of the fuel tank 41. The air bag module 43 has an air bag folded therein.

Now, a fuel supply system will be described. A sub fuel tank 44 is disposed at a position which is on a rear lower side of the fuel tank 41, on the lower side of the rider's seat 42, and between the left and right seat frames 33L, 33R. A fuel pump 54 for feeding out a fuel toward the side of the engine 22 is provided on the inner side of the sub fuel tank 44. The fuel tank 41 and the sub fuel tank 44 are connected to each other via a pipe 53 through which to pass the fuel. The pipe 53 is so disposed as to avoid the cross member 30. By this configuration, the fuel in the fuel tank 41 is fed into the sub fuel tank 44, from which the fuel is supplied to the engine 22 through the fuel pump 54.

The motorcycle 10 also includes side minors 85L, 58R (only symbol 58L on the view's side of the drawing is shown) mounted to a front cowl 36 to permit the rider (driver) to look at the rear side, a headlight 59, a front fender 61, a radiator 62, a radiator shroud 63 provided behind the radiator 62 so as to guide an airflow, a rear fender 65, a tail lamp 66, pillion steps 69L, 69R (only symbol 69L on the viewer's side of the drawing is shown) as foot rests for a pillion passenger, pillion step holders 71L, 71R (only symbol 71L on the viewer's side of the drawing is shown) for mounting the pillion steps 69L, 69R to the seat frames, a rear cushion load regulating member 72 for regulating the load on the rear cushion unit 28, a main stand 73, and a meter unit 74. Further, in the drawings, reference symbol G denotes the center of gravity of the vehicle.

Now, a cowl stay 76 provided at a front portion of the vehicle will be described below.

The motorcycle 10 is provided with the cowl stay 76 for supporting a main cowl 18 extending in front of the left and right main frames 21L, 21R and covering a front portion of the vehicle. The main cowl 18 is supported by the cowl stay 76. Now, detailed structure of the cowl stay 76 will be described below.

The cowl stay 76 is so disposed that, when the vehicle is viewed from a lateral side, its front end portion 76a is located rearward of a front end portion 17a of the front wheel 17 and forward of a tip portion 59a of the headlight 59 provided in front of the head pipe 12 so as to illuminate the front side of the vehicle. The cowl stay 76 is disposed above the center of gravity G of the vehicle.

The cowl stay 76 includes, as its main components: left and right arm parts 77L, 77R (only symbol 77L on the viewer's side of the drawing is shown) extending forwards from the main frames 21L, 21R; a cross part 78 connecting the front ends of the left and right arm parts 77L, 77R to each other; left and right intermediate members 81L, 81R (only symbol 81L on the viewer's side of the drawing is shown) erectly provided at intermediate portions of the left and right arm parts 77L, 77R; left and right upper arm parts 82L, 82R (only symbol 82L on the viewer's side is shown) extending from the main frames 21L, 21R to the left and right intermediate members 81L, 81R; and left and right slant members 83L, 83R (only symbol 83L on the viewer's side is shown) as members which are provided between the left and right intermediate members 81L, 81R and the left and right arm parts 77L, 77R and which reinforce the left and right arm parts 77L, 77R. The cowl stay 76 has its rear end portion mounted to upper support parts 84L, 84R (only symbol 84L on the viewer's side of the drawing is shown) and lower support parts 85L, 85R (only symbol 85L on the viewer's side is shown) which are provided at front portions of the main frames 21L, 21R.

Here, the upper support parts 84L, 84R and the lower support parts 85L, 85R are spaced from each other by a spacing P in the vehicle height direction. The cross part 78 is disposed between the upper support parts 84L, 84R and the lower support parts 85L, 85R in the height direction. This ensures that, when a large load is exerted on the cross part 78 from the vehicle front side, the cowl stay front end portion 76a under the load is less liable to be tilted to the upper or lower side, as compared with the case where the cross part 78 is not disposed between the upper support parts 84L, 84R and the lower support parts 85L, 85R in the height direction. Accordingly, with the cowl stay 76 having the same shape, the load can be borne more securely and a greater shock energy can be absorbed.

Figure 2:
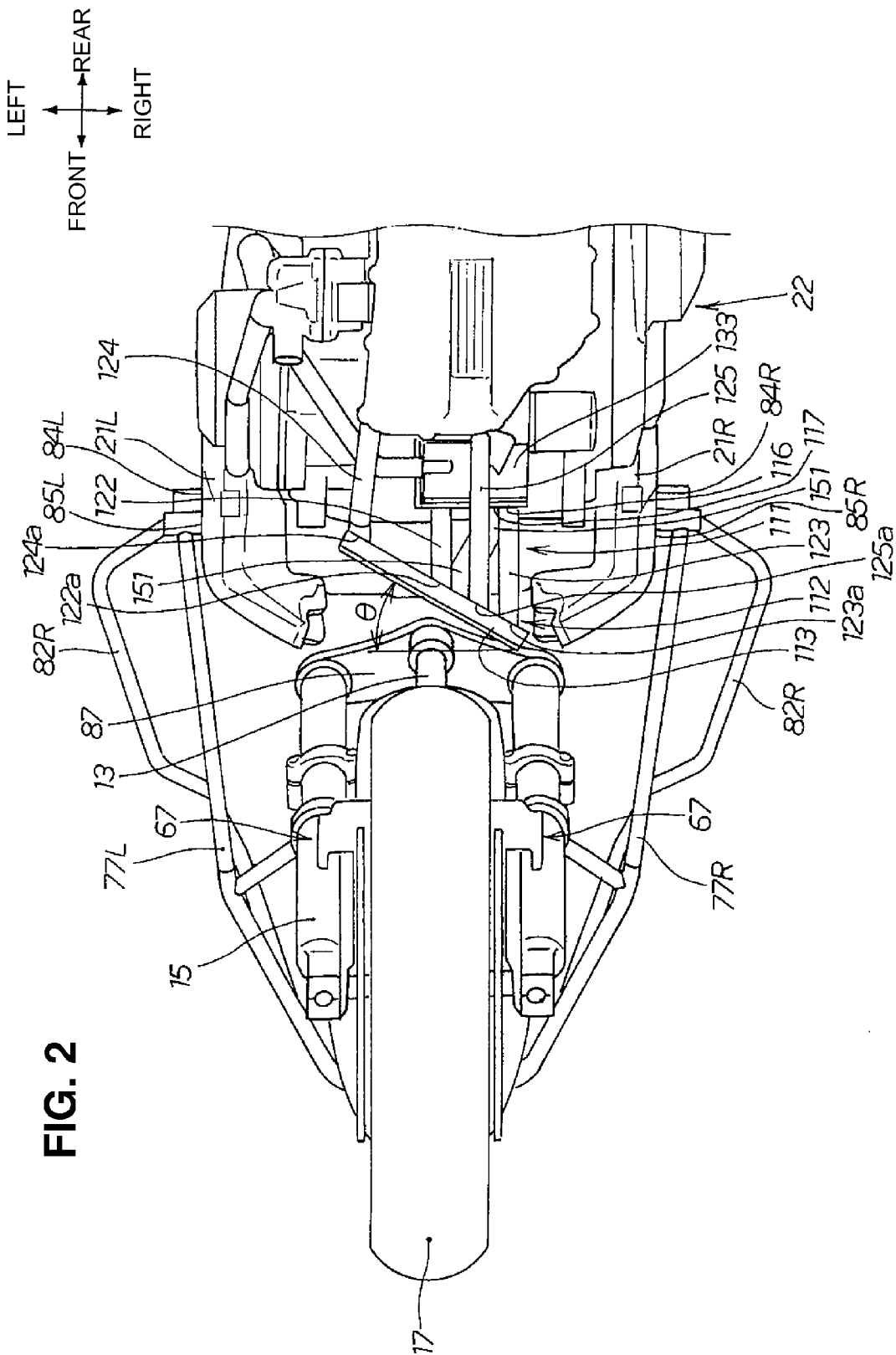
FIG. 2 is a bottom plan view of a front portion of the saddle-type vehicle according to the illustrative embodiment of the present invention.

In FIG. 2, a top bridge 87 for fixing an upper end portion of the front fork 15 is mounted to the steering shaft 13. The top bridge 87 is provided such that it can be steered relative to the head pipe 12 together with the steering shaft 13.

In FIG. 2, front portions of the main frames 21L, 21R, the head pipe 12 for supporting the steering shaft 13, and a bottom bridge 88, disposed at a lower end portion of the head pipe 12 so as to fix an intermediate portion of the front fork 15, are omitted.

Referring to FIGS. 2 to 6, an impact member 110 will be described in detail below.

The impact member 110 is disposed at a position in front of a lower portion of the engine 22 and behind the front wheel 17. In the event of an impact, the impact member 110 receives a large load exerted on the vehicle front side.

The impact member 110 includes a plurality of stay parts 154 having fastening holes 153 (see FIG. 7) formed therein for fastening to the engine 22, and a support part 111 extending forwardly from the stay parts 154. The impact member 110 also includes a load-receiving deflector plate 113 which is mounted to a front end portion 112 of the support part 111, and which is inclined at an angle relative to the vehicle width direction, as viewed from the vehicle lower side.

The load-receiving deflector plate 113 is a surface where a portion on the vehicle left side in the vehicle width direction is inclined by an angle θ against a portion on the vehicle right side. In this illustrative embodiment, θ=30°.

Figure 3:
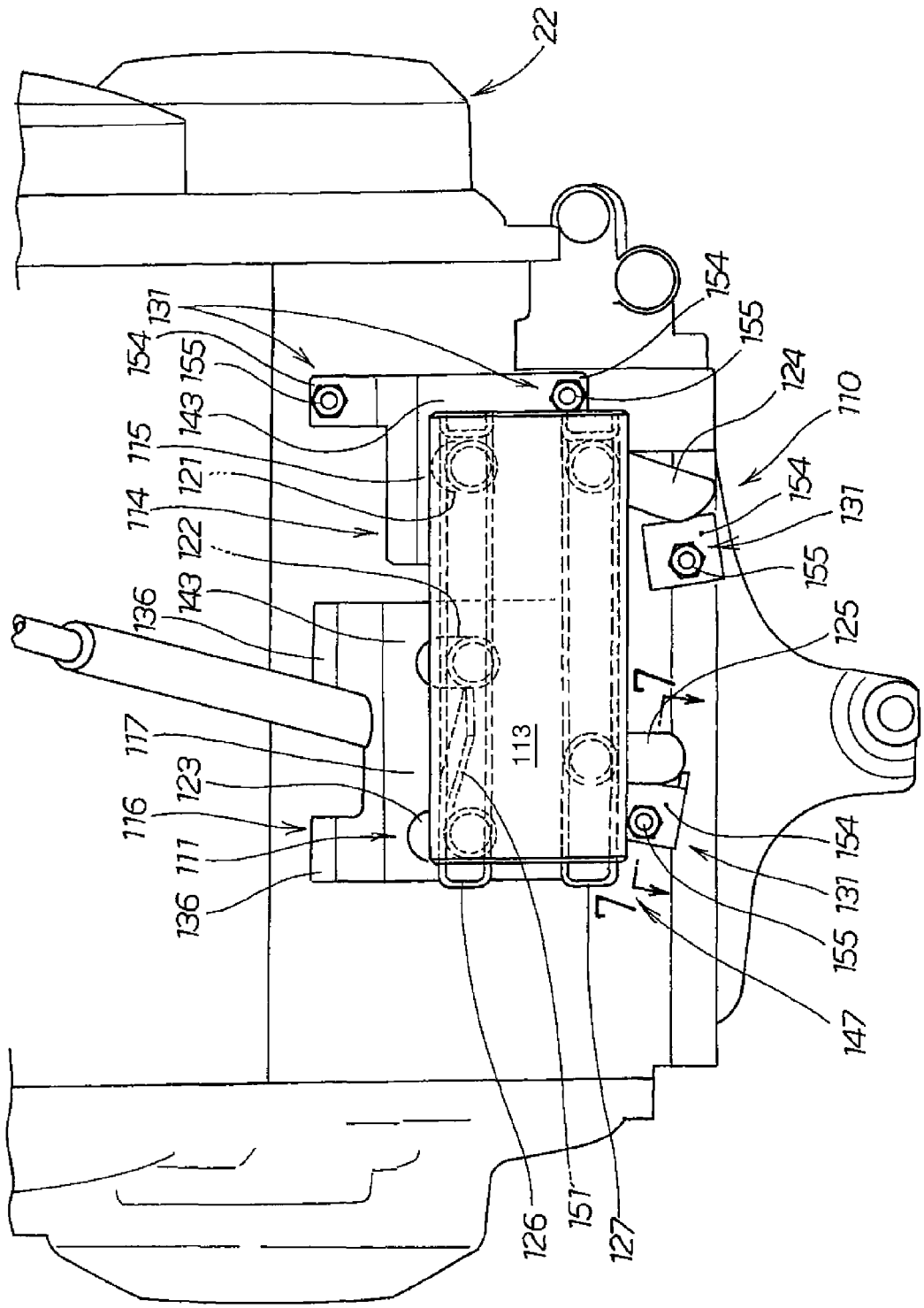
FIG. 3 is a detail front view of an engine and an impact member of the saddle-type vehicle according to the illustrative embodiment of the present invention.
Figure 4:
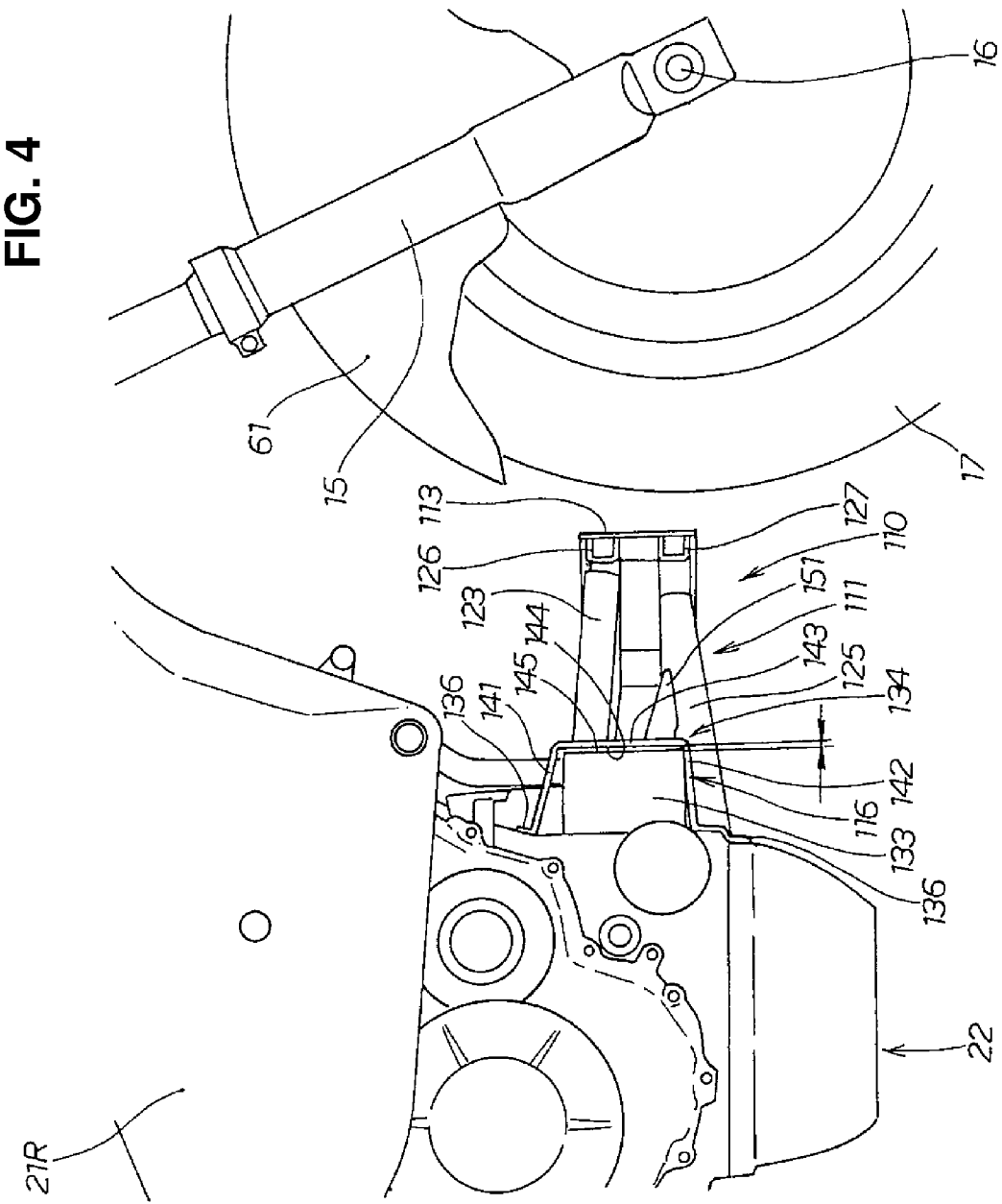
FIG. 4 is a right side detail view of a major part of the saddle-type vehicle according to the illustrative embodiment of the invention.
Figure 5:
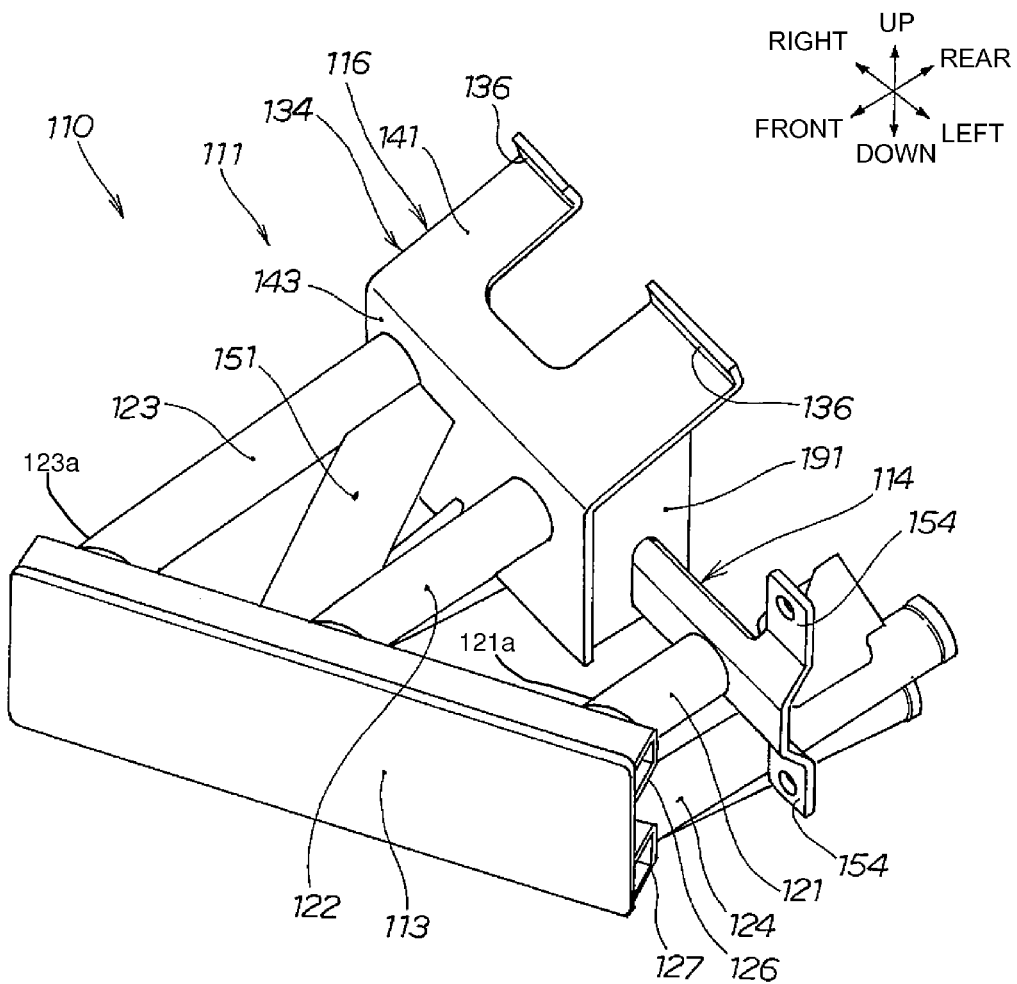
FIG. 5 is a front perspective view of an impact member provided in the saddle-type vehicle according to the illustrative embodiment of the present invention.
Figure 6:
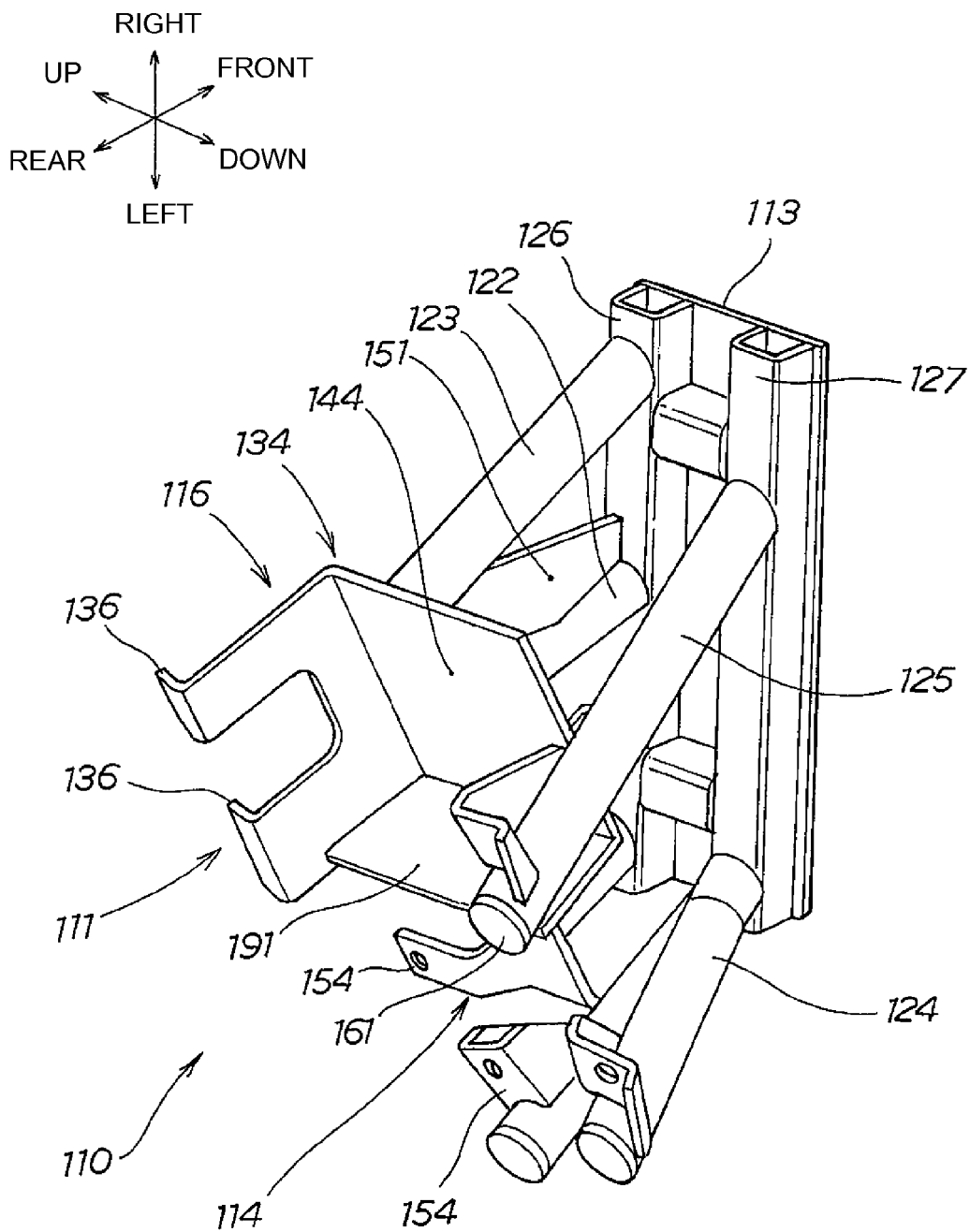
FIG. 6 is a rear perspective view of the impact member provided in the saddle-type vehicle according to the illustrative embodiment of the present invention.
Figure 7:
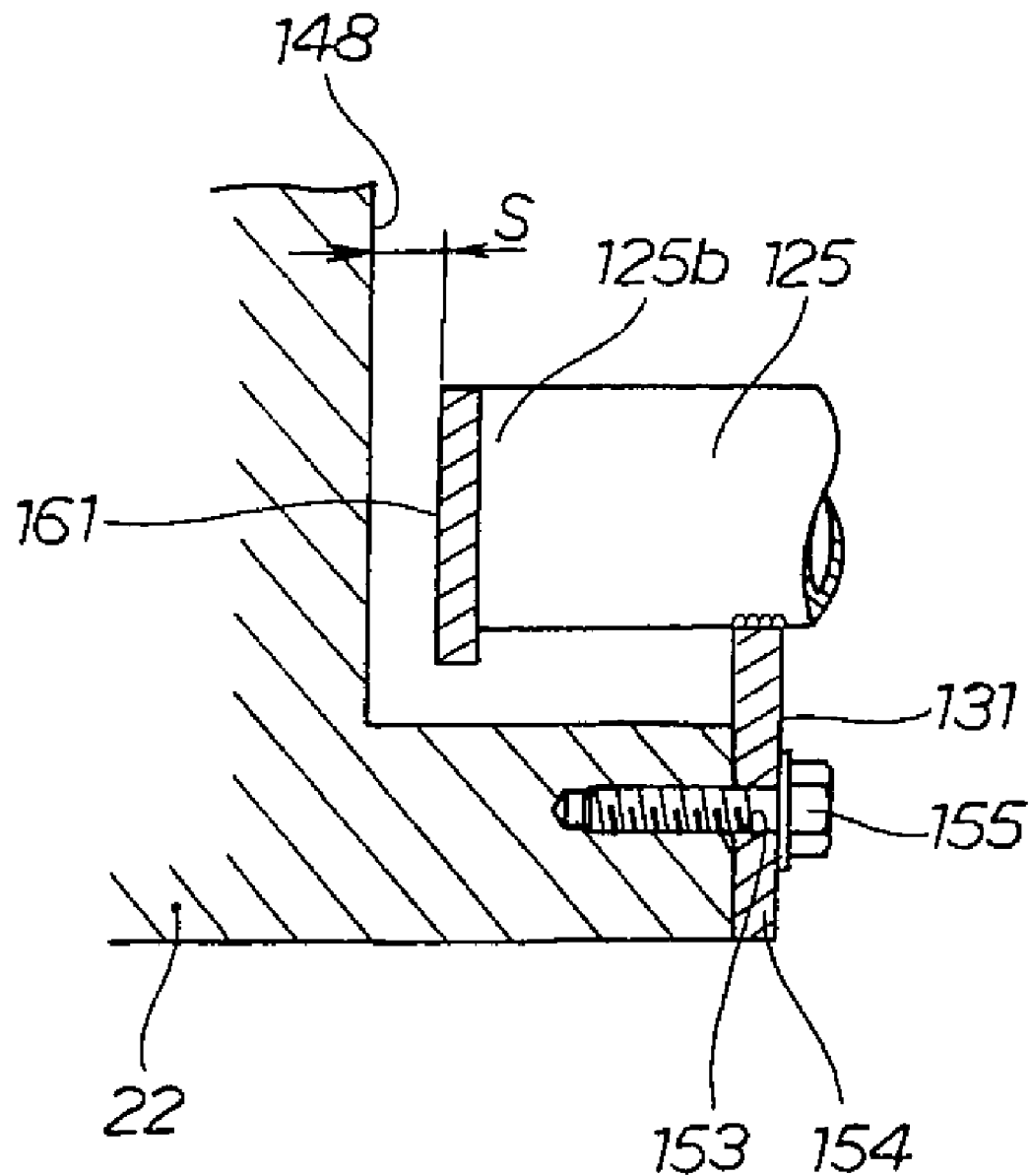
FIG. 7 is a sectional view of the impact member, taken along line 7-7 of FIG. 3.

FIG. 3 is a front view of an engine and an impact member of the saddle-type vehicle according to the illustrative embodiment of the present invention. FIG. 4 is a left side view of a major part of the saddle-type vehicle according to the invention. FIG. 5 is a front perspective view of an impact member provided in the saddle-type vehicle according to an illustrative embodiment of the present invention. FIG. 6 is a rear perspective view of the impact member provided in the saddle-type vehicle according to the illustrative embodiment of the present invention, and FIG. 7 is a sectional view taken along line 7-7 of FIG. 3.

Referring now to FIGS. 3-7, it will be seen that the support part 111 includes a first support base member 114 disposed on a left front side of the engine 22, a first support pipe 121 extending forward from a front surface 115 of the first support base member, and a second support base member 116 attached to the first support base member 114 and disposed on a right front side of the engine 22. The support part 111 also includes second and third support pipes 122, 123 extended forwardly from a front surface 117 of the second support base member.

The support part 111 also includes an upper backing part 126 which is mounted to each of the first, second and third support pipe front end portions 121a, 122a, 123a so as to extend substantially in the vehicle width direction. The upper backing part 126 reinforces and backs an upper portion of the load-receiving deflector plate 113.

The support part 111 also includes fourth and fifth support pipes 124, 125 (FIGS. 2, 3 and 6) disposed below the first support base member 114 and extended forwards from a front surface of the engine 22, and a lower backing part 127 which is mounted to fourth and fifth support pipe front end portions 124a, 125a so as to extend in the vehicle width direction and which reinforces and backs the load-receiving deflector plate 113.

In addition, the first and second support base members 114, 116 and the fourth and fifth support pipes 124, 125 have fastening parts 131 . . . ( . . . indicates plurality, here and hereafter) for fastening the impact member 110 to the engine 22. The load-receiving deflector plate 113 is supported, and the impact member 110 is fixed to the engine 22 by the fastening parts 131 . . . .

The stay parts 154 . . . include the fastening parts 131 . . . , and each of the fastening parts 131 . . . has a respective fastening hole 153 formed therein. The respective stay parts 154 . . . are fastened to the engine 22 by fastening bolts 155.

As seen in FIG. 4, the second support base member 116 includes a U-shaped part 134 which is formed in a substantially rectangular U-shape as seen in side view, and which protectively surrounds an oil cooler 133 projectingly disposed at the front surface of the engine 22; and base parts 136 . . . formed at mounting end parts thereof for use in mounting the rectangular U-shaped part 134 to the engine 22, so as to be set along the outer shape of the engine 22. A link plate 191 (FIGS. 5-6) is formed as part of the second support base member 116, and is provided at a side portion of the rectangular U-shaped part 134, for closing the rectangular U-shaped part 134, and for linking to an end portion of the first support base member 114.

The rectangular U-shaped part 134 is composed of upper and lower support pieces 141, 142, and a front receiving part 143 which is bridgingly provided between the upper and lower support pieces 141, 142. As shown in FIG. 5, the second and third support pipes 122, 123 are mounted.

A receiving part rear surface 144 is disposed in parallel to an oil cooler front surface 145. Specifically, an engine front portion 147 is provided with an oil cooler 133, and the receiving part rear surface 144 of the second support base member 116 having a plate-like shape is disposed in front of the oil cooler 133 and parallel to the oil cooler front surface 145.

During a vehicle crash or collision, when a large load is exerted on the impact member 110 from the front side thereof, the first and second support base members 114, 116 are moved rearwards, and the receiving part rear surface 144 of the second support base member 116 and the oil cooler front surface 145 make surface contact with each other.

The engine 22, formed of an aluminum casting, receives the load through surface contact, such that the load is borne in a diffused manner as compared with the case where the load is received through point contact or line contact. Accordingly, the impact member 110 can be mounted, without locally enhancing the rigidity of the engine 22.

In front of the engine 22, the first to fifth support pipes 121 to 125 extend in the longitudinal direction of the vehicle. As the support pipes 121 to 125 of the support part 111, pipe members as inexpensive standard parts can be used; therefore, the cost of the support part 111 can be lowered. Incidentally, while the number of the support pipes in this illustrative embodiment is five, the number of support pipes may not necessarily be five, and may be any arbitrary number of two or more, selected for a particular application.

Furthermore, in the depicted embodiment, a reinforcing member 151 is bridgingly provided between the second support pipe 122 and the third support pipe 123. The reinforcing member 151 is arranged extending in the vehicle width direction.

Since the second and third support pipes 122 and 123 are linked to each other by the reinforcing member 151, it is possible to prevent the support pipes 122, 123 from being crushed under a load exerted from the front side. In other words, a load received at the load-receiving deflector plate 113 can be securely borne while reducing the possibility of buckling by the reinforcing member 151.

In FIG. 7, a fifth support pipe rear end portion 125b is mounted to the engine-side fastening part 131 through the stay part 154 and the fastening bolt 155. A rear surface 161, which corresponds to the mounting surface of the fifth support pipe 125 and which is located on the side which faces the engine front surface 148, of the stay part 154 is so disposed as to form a spacing S between itself and the engine front surface 148. In this illustrative embodiment, the value of the spacing S is 1 mm.

When a large load is exerted on the fifth support pipe 125 from the front side of the vehicle, the stay part rear surface 161, on the side which faces the engine front surface 148, comes into contact with the engine front surface 148. With a configuration in which the strength and plate thickness and the like of the stay part 154 are set such that the stay part 154 is elongated until the stay part rear surface 161 makes contact with the engine front surface 148, the energy due to the large load in the beginning stage of deformation of the impact member 110 can be absorbed by the stay part 154. After the rear surface 161 abuts on the engine front surface 148, the load exerted on the impact member 110 is received by the stay part 154, and the load is received by the engine front surface 148. Where no support base member is provided, the support pipes are mounted to the engine 22 through the stay parts 154, and, accordingly, the local concentration of load on the engine front surface can be obviated.

Specifically, the stay part 154 is welded to the fifth support pipe rear end portion 125b, which more specifically is an outer peripheral surface of the fifth support pipe 125. Therefore, the contact of the support pipe with the engine 22 and the transmission of the load can be made to be uniform, as compared with the case where only the fifth support pipe rear end portion 125b makes contact with the engine front surface 148 to receive the load.

Now, operation of the above-described impact member will be described below.

Figure 8A:
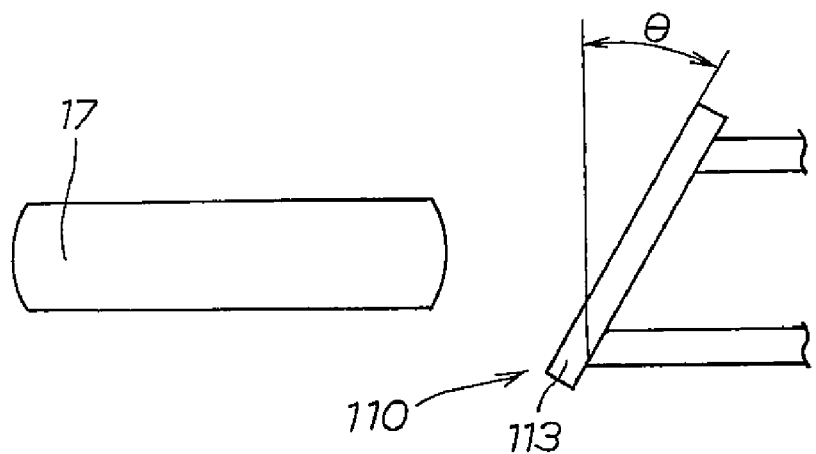
FIG. 8A is a simplified bottom plan view of a wheel and impact member at a first time, showing operation of the impact member when displacement of the front wheel of the saddle-type vehicle has not yet occurred, according to an illustrative embodiment of the present invention.

In FIG. 8A, there is shown a condition where displacement of the front wheel 17 has not yet occurred, and the front wheel 17 and the impact member 110 are spaced from each other.

Figure 8B:
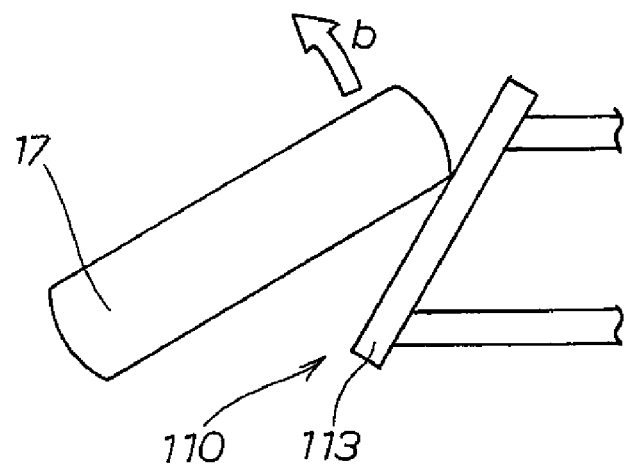
FIG. 8B is a simplified bottom plan view of a wheel and impact member at a second time which is later than the first time of FIG. 8a, showing operation of the impact member after an impact has occurred, when the front wheel of the saddle-type vehicle has made contact with the load-receiving deflector plate according to the illustrative embodiment of the present invention.

In FIG. 8B, when the front wheel 17 is moved rearwards when a large load is applied to the front side of the vehicle, the front wheel 17 collides on the load-receiving deflector plate 113, which is inclined such that a left end portion is set on the rear side relative to the vehicle width direction when viewed from the side. Then, the front wheel 17 is moved rearward while being turned in the direction of arrow b in the while being steered to the right side. Therefore, when the front wheel 17 is moved rearwards, the front wheel 17 makes contact with the load-receiving deflector plate 113, and is moved along the load-receiving deflector plate 113.

Figure 8C:
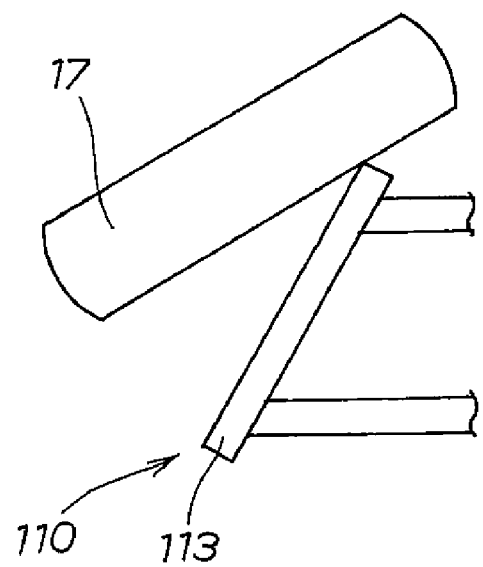
FIG. 8C is a simplified bottom plan view of a wheel and impact member at a third time which is later than the second time of FIG. 8B, showing operation of the impact member when the front wheel of the saddle-type vehicle is moved further rearward along the load-receiving deflector plate according to the illustrative embodiment of the present invention.

In FIG. 8C, the front wheel 17 is further displaced, and is moved further rearward along the load-receiving deflector plate 113. Since the front wheel 17 is diverted rearward along the load-receiving deflector plate 113, the front wheel 17 does not collide on the engine 22 disposed behind the front wheel 17, and the front wheel 17 can be sufficiently displaced rearward. Since a large displacement amount of the front wheel 17 is allowed, when the vehicle receives a large load from the front side the load can be easily absorbed.

With the configuration of the impact member 110 according the illustrative embodiment of the present invention, a sufficient deformation amount of the front fork 15 is allowed, without forming a front end portion of the body frame into a bow-like shape or having a bow-shaped part. Therefore, a sufficient deformation amount of the front fork 15 is allowed even in the case where it is difficult to provide a bow-shaped part at a front portion of the body frame 11 which is located behind the front wheel 17. As a result, it is unnecessary to form a front portion of the body frame 11 located behind the front wheel 17 into a bow-like shape or to provide a bow-shaped part at the front portion of the body frame 11. Accordingly, the degree of freedom in designing the body frame 11 can be enhanced.

Operation of the impact member 110 in the case where the front wheel 17 faces forwards at the time when the front wheel 17 makes contact with the impact member 110 has been described above. In the case where the front wheel 17 is being steered/turned to the right at the time of making contact with the impact member 110, the impact member 110 operates similar to the case where the front wheel 17 faces forward at the time of contact with the impact member 110. Operation of the impact member 110 in the case where the front wheel 17 is being steered/turned to the left at the time of making contact with the impact member 110, contrary to the above-described, will now be described.

Figure 9A:
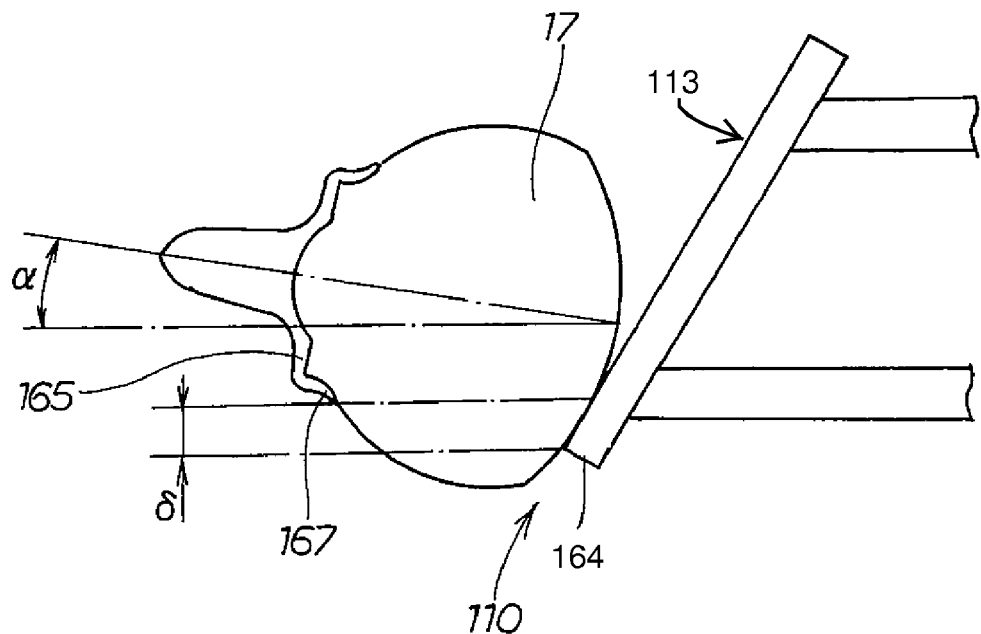
FIG. 9A is a simplified bottom plan view showing a portion of a wheel and impact member in a case where a steering angle of a front wheel is on the opposite side from a receiving surface of the impact member and where the front wheel of the saddle-type vehicle makes contact with the load-receiving deflector plate.

FIG. 9A is a simplified bottom plan view showing a portion of a wheel and impact member in a case where a steering angle of a front wheel is on the opposite side from a receiving surface of the impact member and where the front wheel of the saddle-type vehicle makes contact with the load-receiving deflector plate. FIG. 9A illustrates operation of the impact member 110 in the case where the front wheel 17 makes contact with the load-receiving deflector plate 113 while being steered/turned to the left at a steering angle α.

Figure 9B:
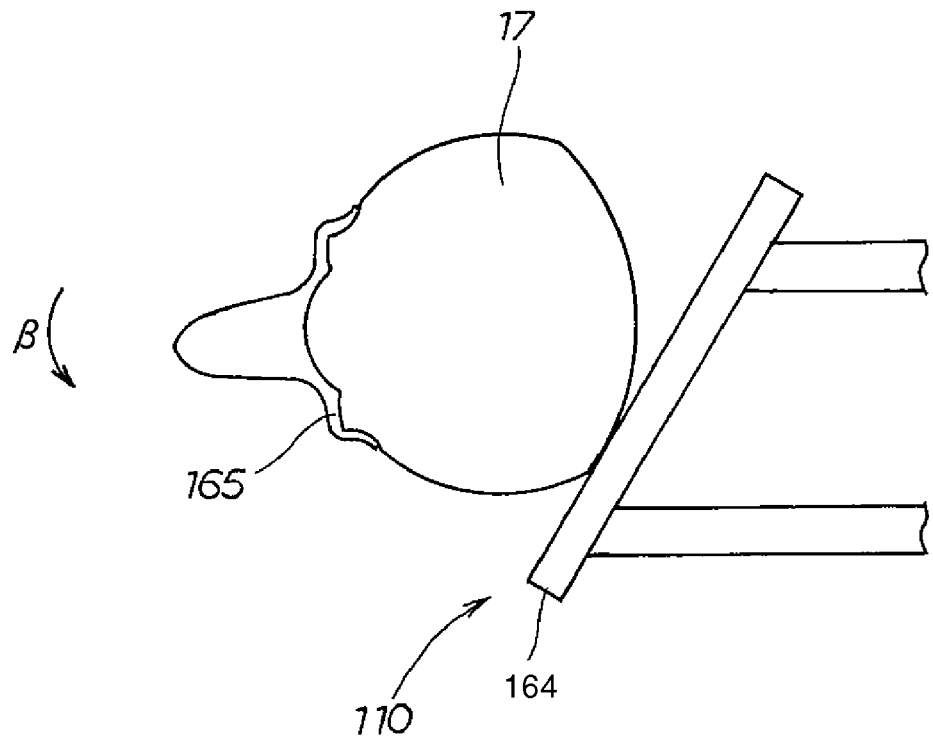
FIG. 9B is a simplified bottom plan view showing a portion of a wheel and impact member similar to that shown in FIG. 9A, but at a later time when the front wheel of the saddle-type vehicle is moved further rearward along the load-receiving deflector plate.

FIG. 9B is a simplified bottom plan view showing a portion of a wheel and impact member similar to that shown in FIG. 9A, but at a later time when the front wheel of the saddle-type vehicle is moved further rearward along the load-receiving deflector plate.

In FIG. 9B, a load is exerted on the front wheel 17, and the front wheel 17 is moved rearward while being moved along the load-receiving deflector plate 113, specifically, while being steered to the right side, as indicated by β. In this illustrative embodiment, a maximum value of the angle α is set to be α=10°. Within the range up to this angle value, even if the front wheel 17 makes contact with the impact member 110 while being steered to the left, the front wheel 17 can be smoothly moved rearward while being gradually rectified through rightward steering by the function of the load-receiving deflector plate 113. The setting of α=10° makes it possible to handle almost all cases.

Thus, even when the steering direction of the front wheel 17 is on the same side as the inclination direction of the load-receiving deflector plate 113, the same effect as that in the case of leftward steering can be obtained by the load-receiving deflector plate 113 insofar as the steering angle is within the range up to a predetermined angle.

In addition, the length of a right end portion 164 of the load-receiving deflector plate 113 is set such that the right end portion 164 protrudes from an outermost portion 167 in the width direction of a rim part 165 of the front wheel 17, by a length δ to the outer side in the vehicle width direction. Since the end portion of the load-receiving deflector plate 113 is set on the outer side relative to the end portion of the rim part 165, at the time of steering of the front wheel 17, there is no fear that the rim part 165 might be caught by an impact member receiving part 143 thereby hampering smooth movement of the front wheel 17.

In FIG. 10A, there is shown a condition immediately after collision of the front wheel 17 against a wall part 171 of a structure, wherein displacement of the front wheel 17 has not yet occurred. Incidentally, in this illustrative embodiment, a cowl stay front end portion 176 is disposed on the rear side relative to a front wheel front end portion 177. In the condition where displacement of the front wheel 17 has not yet occurred, therefore, the cowl stay front end portion 176 is spaced from the wall part 171.

In FIG. 10B, there is shown a condition where the front wheel 17 is displaced rearward because of a large load exerted on the front wheel 17. In this instance, the amount of deformation of the front wheel 17 is small, such that the cowl stay front end portion 176 has not yet collided on the wall part 171.

Figure 11:
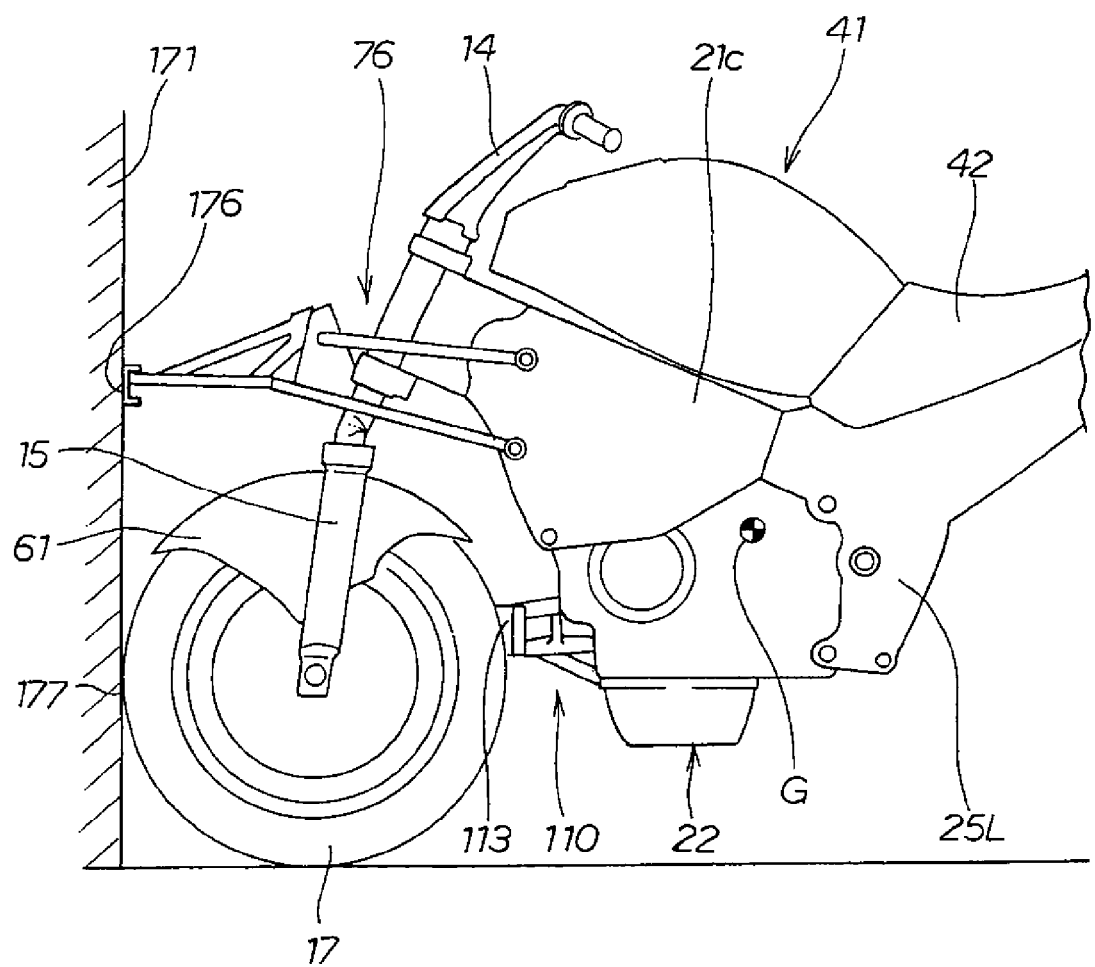
FIG. 11 illustrates operation of the saddle-type vehicle according to an illustrative embodiment of the present invention when the front wheel receives a load at the impact member and also receives a load at a cowl stay.
Figure 12A:
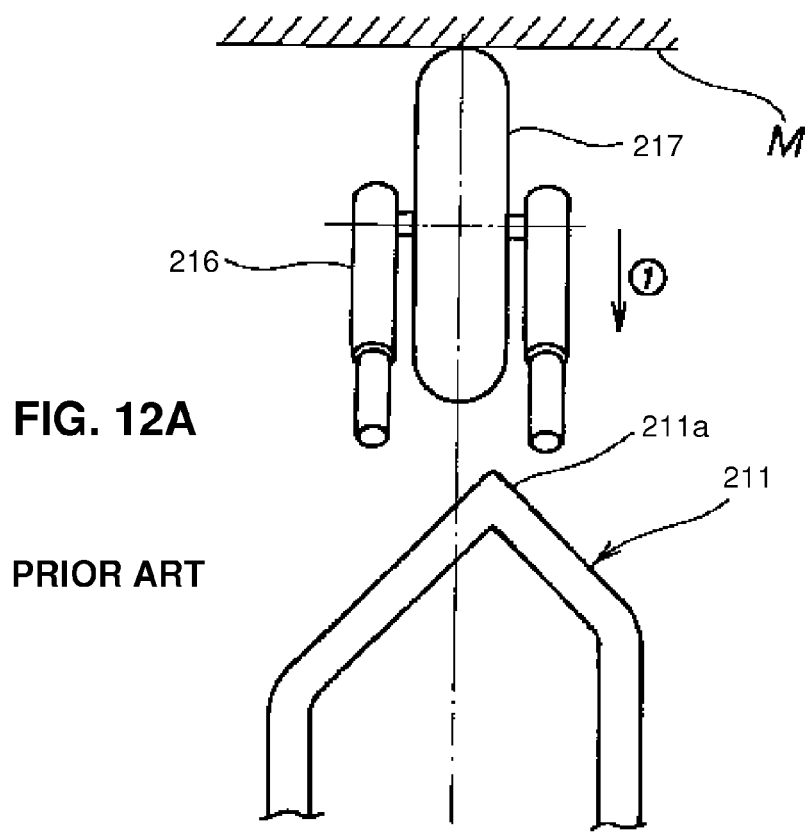
FIG. 12A is a simplified top plan view of a portion of a prior art motorcycle frame, fork and wheel, with the motorcycle shown beginning to collide with an obstruction M.
Figure 12B:
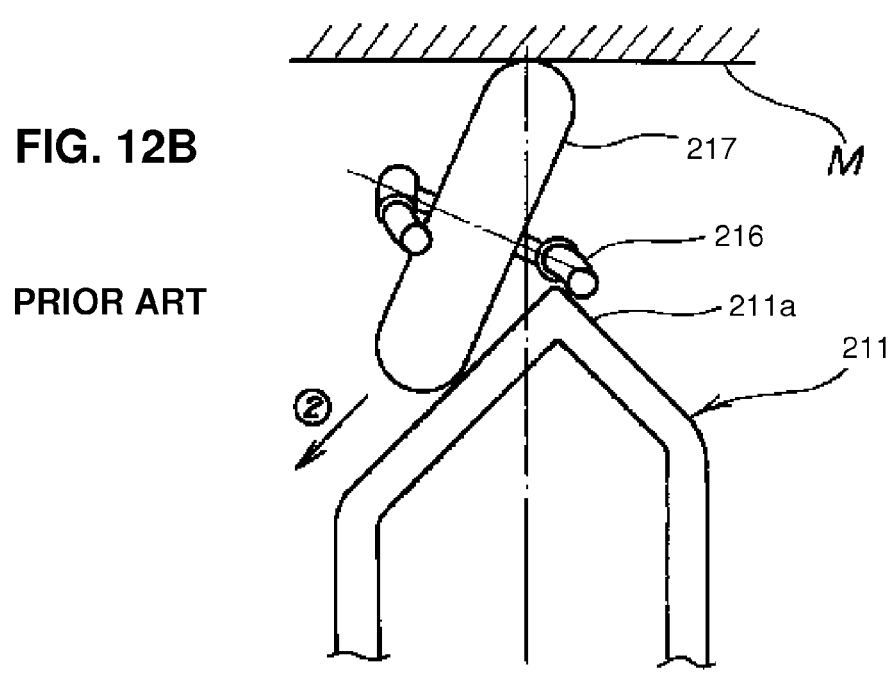
FIG. 12B is a simplified top plan view of the prior art motorcycle frame, front fork and wheel of FIG. 12A, with the motorcycle shown after collision with the obstruction M.

In FIG. 11, there is shown a condition where displacement of the front wheel 17 under the large load exerted on the front wheel 17 has progressed, the front wheel 17 has made contact with the load-receiving deflector plate 113, and the front wheel 17 has been displaced rearward while being guided by the load-receiving deflector plate 113. In this instance, the amount of deformation of the front wheel 17 has increased so that not only the front wheel 17 but also the cowl stay front end portion 176 has made collision against the wall part 171.

When the cowl stay front end portion 176 collides on the wall part 171, the center of gravity G of the vehicle is located lower than the cowl stay front end portion 176 in the height direction. Therefore, when the vehicle receives a load from the front side, the vehicle tends to be rotated counterclockwise about its portion between the point of contact of the front wheel with the wall part and the grounding point of the front wheel; that is, a so-called pitching behavior is liable to be generated.

In connection with this grounding point, in the present invention, the cowl stay front end portion 176 is disposed above the center of gravity G. With such a layout, even when a large load is exerted on the vehicle from the front side, part of the load can be received by the cowl stay front end portion 176 and, therefore, the pitching behavior of the vehicle can be restrained. In motorcycles on which an air bag is mounted, in the cases where it is appropriate to restrain the pitching, adoption of the structure according to the present invention is effective.

Returning to FIG. 4, when a load is exerted on the vehicle from the front side, the load can be received at a front lower portion of the engine 22 by the stay parts 154 fastened to the engine 22 and the support pipes 121 to 125 making contact with the engine 22, and, further, the load received by the support pipes 121 to 125 can be received by the oil cooler front surface 145 through the support base member 116.

Therefore, the impact member 110 can be favorably supported in a large area of the engine front surface 148, even in the cases where it is difficult to secure an area of a support part for supporting the impact member 110 on the engine 22 or where the rigidity of the engine 22 is low as compared with the impact member 110.

Furthermore, since the mounting end portion to which the support base member 116 is mounted is provided further with base parts 181 . . . , the load exerted on the impact member 110 can be received by the base parts as a whole. Accordingly, the impact member 110 can be supported securely in an area larger than the area of the engine front surface 148.

Incidentally, while the present invention is applied to a motorcycle such as in the illustrative embodiment above, the invention is also applicable to other saddle-type vehicles and may be applied to general vehicles.

INDUSTRIAL APPLICABILITY

The present invention is preferably applicable to a motorcycle in which an impact member for receiving a great load exerted from the front side is disposed in front of an internal combustion engine.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A saddle-type vehicle, comprising:
    a body frame including a head pipe for rotatably supporting a steering shaft thereon, and a main frame extending rearwardly from the head pipe;
    an internal combustion engine operatively mounted on the main frame; and
    an impact assembly operatively attached to a front lower portion of the engine for receiving a load exerted from a vehicle front side in the event of an impact, said impact assembly comprising:
        a stay part comprising a fastening member which is fastened to the engine;
        a support part which extends forward from the stay part; and
        a load-receiving part comprising a deflector member which is mounted to the support part and inclined away from a vehicle width direction when the vehicle is viewed in top plan view.

2. The saddle-type vehicle according to claim 1, wherein the support part comprises a plurality of support pipes extending substantially in a longitudinal direction of the vehicle, and at least one reinforcing member disposed across at least two of said support pipes.

3. The saddle-type vehicle according to claim 1, wherein an oil cooler is provided at a front portion of the engine; and wherein the deflector member comprises a cover member including a forward plate portion disposed in front of and parallel to a front surface of the oil cooler.

4. The saddle-type vehicle according to claim 3, wherein the cover member further comprises a base part configured to be placed along a front outer portion of the engine.

5. The saddle-type vehicle according to claim 2, wherein an oil cooler is provided at a front portion of the engine; and wherein the deflector member comprises a cover member including a forward plate portion disposed in front of and parallel to a front surface of the oil cooler.

6. The saddle-type vehicle according to claim 5, wherein the cover member further comprises a base part configured to be placed along a front outer portion of the engine.

7. The saddle-type vehicle according to claim 1, wherein the support part comprises a support base member in front of the engine; and first and second support pipes which extend forwardly from a front surface of the support base member, and which are operatively connected to the deflector member.

8. The saddle-type vehicle according to claim 7, wherein a portion of the support base member is formed substantially in a U-shape, and partially surrounds an oil cooler which is provided at a front end of the engine.

9. An impact member for mounting on an internal combustion engine of a vehicle, said impact member comprising:
    a stay part having a fastening portion for fastening to an engine, the stay part having a longitudinal axis;
    a support part which extends forwardly from the stay part; and
    a load-receiving part comprising a deflector member which is mounted to the support part and which is inclined at an angle relative to the longitudinal axis of the stay part.

10. The impact member according to claim 9, wherein the support part comprises a plurality of support pipes extending in a longitudinal direction; and a reinforcing member disposed across at least two of said support pipes.

11. The impact member according to claim 9, wherein an oil cooler is provided at a front portion of the engine; and wherein the deflector member comprises a cover member including a forward plate portion disposed in front of and parallel to a front surface of the oil cooler.

12. The impact member according to claim 10, wherein an oil cooler is provided at a front portion of the engine; and wherein the deflector member comprises a cover member including a forward plate portion disposed in front of and parallel to a front surface of the oil cooler.

13. The impact member according to claim 11, wherein the support part comprises a support base member for placement in front of the engine, and first and second support pipes which extend forwardly from a front surface of the support base member, and which are operatively connected to the deflector member.

14. The saddle-type vehicle according to claim 13, wherein a portion of the support base member is formed substantially in a U-shape, and partially surrounds an oil cooler which is provided at a front end of the engine.

* * * * *